June 22, 1965 G. REZEK 3,191,099

RANDOM ACCESS MEMORY

Filed May 12, 1961 2 Sheets-Sheet 1

INVENTOR.

BY GERARD REZEK

[signature]

ATTORNEY

RANDOM ACCESS MEMORY

Filed May 12, 1961 2 Sheets-Sheet 2

INVENTOR.
GERARD REZEK
BY
Carl N. Olson
ATTORNEY 3,191,099
RANDOM ACCESS MEMORY
Gerard Rezek, Collingswood, N.J., assignor to Radio Corporation of America, a corporation of Delaware
Filed May 12, 1961, Ser. No. 109,739
3 Claims. (Cl. 317—101)

This invention relates to random access memories, and more particularly to constructions of memory planes and associated circuits. While not limited thereto, the invention is particularly useful in word organized, random access memories in electronic computers.

High speed, random access memories are generally constructed of a large number of magnetic memory elements, such as ferrite cores, which are linked by a plurality of conductors. An array of memory elements may be constituted by a plurality of stacked memory planes wherein each plane includes systematically arranged rows and columns of magnetic cores. When large numbers of magnetic memory elements are included in the array, it is important for reasons of compactness, economy of operation and speed of operation that the magnetic cores and linking conductors be very closely spaced. The conductors linking the magnetic cores must be connected to electronic circuitry for reading information into and out of selected ones of the cores. Previously known constructions have imposed practical and economical limitations on the desired compactness, electrical characteristics and serviceability of word organized, random access memory systems.

It is therefore a general object of this invention to provide an improved random access memory construction which is characterized in providing increased compactness, increased speed of operation, economy of manufacture and ready serviceability.

It is another object to provide an improved memory plane construction.

It is a further object to provide an improved construction of a memory plane and associated memory addressing circuitry.

In one aspect, the invention comprises a rectangular frame of insulating material having electrical connector elements extending through one side of the frame. The conductor elements have a wire-connection end inside the frame and have a quick-disconnect connector end outside the frame. A similar number of terminal elements are provided extending through the opposite side of the frame and having wire connection ends on the inside of the frame. Columns of memory elements are arranged within the frame and are linked by column conductors each of which is connected from the wire-connection end of a connector element to the wire-connection end of a terminal element. The connector elements are of unitary construction and each serve at one end to support the end of a column conductor, and serve at the other end to provide a quick-disconnect connection with associated addressing circuitry.

A portion of the addressing circuitry, including elements such as selection diodes, is mounted on printed circuit boards each of which have an insulating member along one edge. Electrical connector elements extending through the insulating member have a printed-circuit-connection end and have a quick-disconnect connector end adapted to engage the quick-disconnect connector ends of the connector elements on the frame. Additional quick-disconnect connector elements are provided on the insulating member and on the frame for connecting the printed circuit board through the frame to other circuits. The construction provides for the ready removal and substitution of a printed circuit board for maintenance purposes, and lends itself to automation production techniques, while at the same time providing a more compact structure than is feasible and economical using previously known manually-performed connection schemes. Compactness of construction is very important in achieving high speed operation of a memory because, among other things, compactness minimizes distributed reactances which limit speed of operation.

These and other objects and aspects of the invention will be apparent to those skilled in the art from the following more detailed description taken in conjunction with the appended drawings, wherein.

Figures 1, 2:
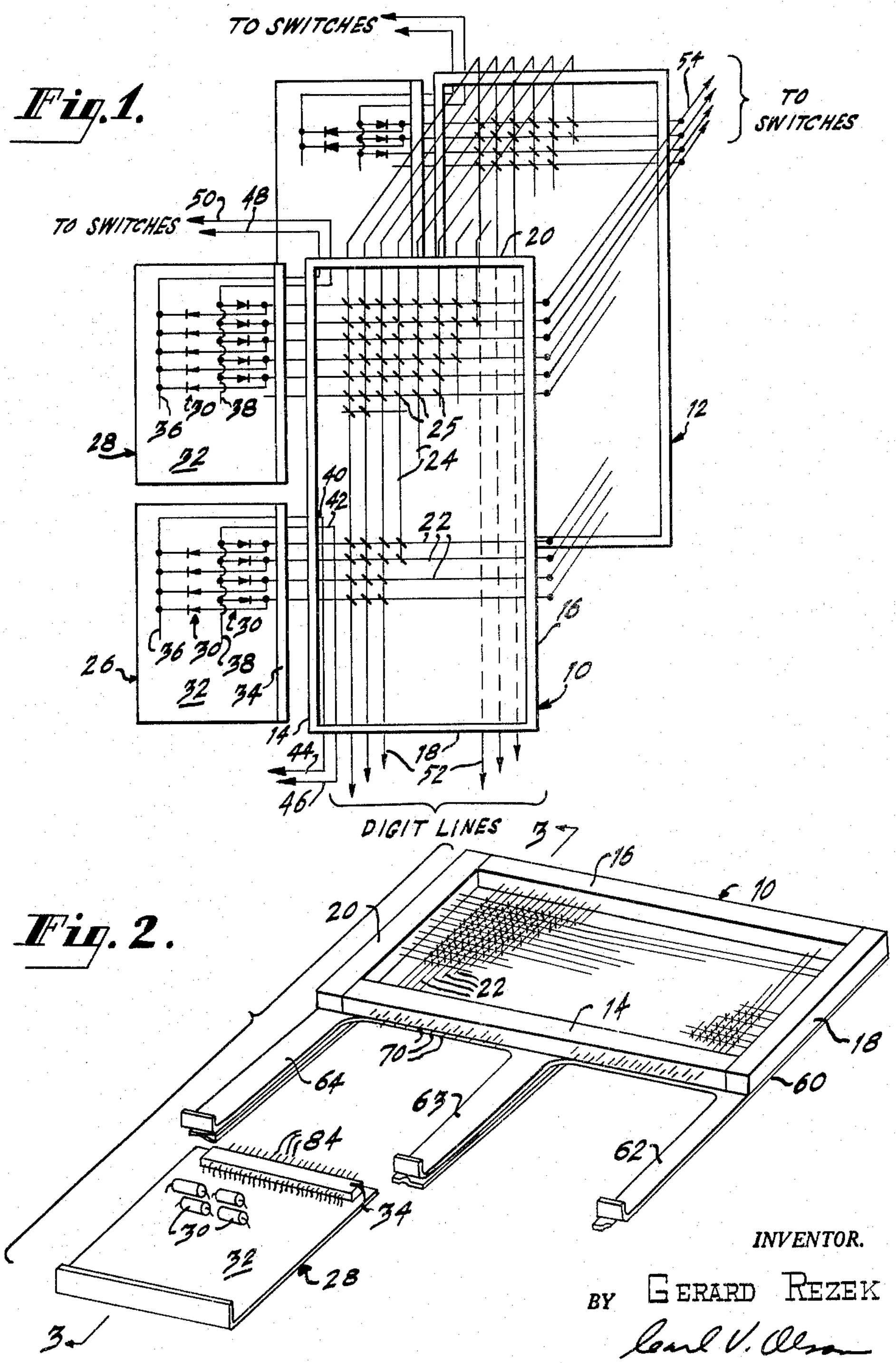
FIGURE 1 is an isometric view of two memory planes and associated circuit boards which serves to illustrate a word organized, random access memory array including many memory planes.
FIGURE 2 is an isometric view of a single memory plane and an associated circuit board, the view illustrating mechanical construction features according to the invention.

The word organized random access memory array illustrated in FIGURE 1 includes two of a large number of stacked memory planes 10 and 12. The memory plane 10 includes a frame of insulating material having one side 14, and other sides 16, 18 and 20, of which the side 16 is opposite from the one side 14. Column conductors 22 extend between the sides 14 and 16, and row conductors 24 extend between the sides 18 and 20, the designations "column" and "row" being arbitrary and being intended to distinguish between sets of orthogonally related conductors. A magnetic core memory element such as a ferrite core 25 is located at each of the intersections of the column conductors 22 and row conductors 24.

The circuit boards 26 and 28 are arranged on the one side 14 of the memory plane 10. The circuit boards 26 and 28 contain diodes 30 and printed wiring, there being two diodes 30 for each column conductor 22 in the memory plane 10. The circuit boards include an insulating planar board 32 and an insulating member 34. Each of the diodes 30 is connected on one side to a column conductor 22 and is connected on the other side to one of the buses 36 and 38 on the circuit board. The buses 36 and 38 on circuit board 26 are in turn connected to conductors 40 and 42 inside the frame of the memory plane 10. The conductors 40 and 42 are connected through another side 18 of the memory plane 10 to the external conductors 44 and 46. A similar connection is made from the buses 36 and 38 on the circuit board 28 to the external conductors 48 and 50.

The word organized memory system of FIGURE 1 is arranged so that a word in the memory is stored in correspondingly positioned memory elements in all of the many memory planes. For example, all of the memory elements in the extreme upper left hand corner of the many memory planes 10 and 12 store one word in the memory.

This word is addressed by energizing the digit line 52, the selection line 52, and one or another of the selection lines 48 and 50, depending on whether addressing is for the purpose of reading out from, or writing into, the memory. Additional conductors (not shown) linking the cores may be included if required for a desired mode of operation.

It will be noted that there are twice as many diodes 30 as there are column conductors 22. The practice according to the prior art has been to solder the diodes 30 to wire-connection terminals along the side 14 of the memory plane 10. The prior art construction is extremely difficult when the memory plane includes a very large number of closely spaced memory elements having a correspondingly large number of closely spaced column conductors 22. Another serious disadvantage of the prior art construction is that the soldering of diodes to the edge of the memory plane involves heat that may damage the diodes, and the permanent connection of the diodes makes it very difficult and time consuming to trace failures in the diodes and replace defective diodes. There is described herein a novel construction of a memory plane and diode circuits which incorporates quick-disconnect connector features.

Figure 3:
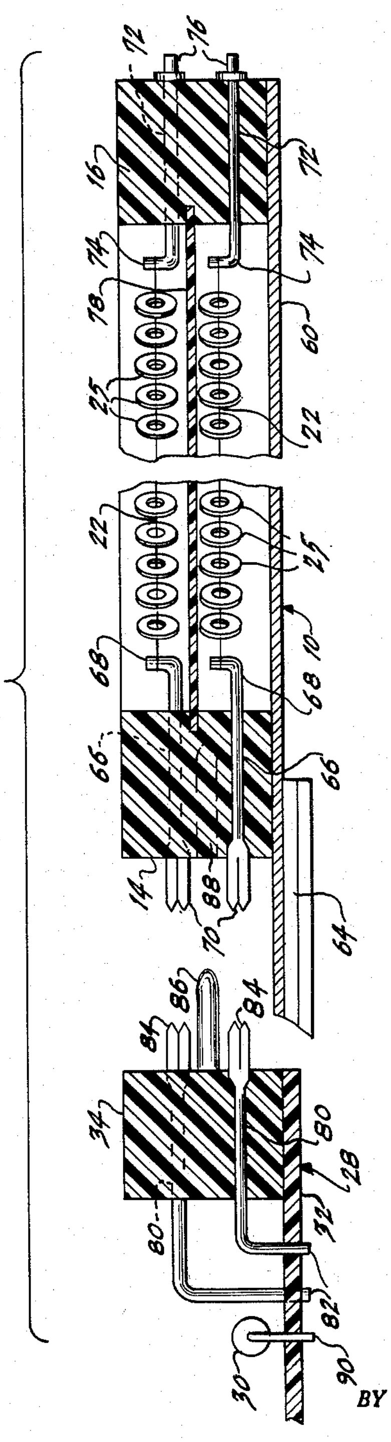
FIGURE 3 is a fragmentary sectional view taken through the circuit board and memory plane of FIGURE 2 to illustrate constructional details according to the invention.

FIGURES 2 and 3 show applicant's mechanical construction of memory plane 10 and circuit board 28. The memory plane 10 includes a rectangular frame 14, 16, 18 and 20 made of an insulating material. The memory plane is provided with a nonmagnetic metal shield 60 having extensions 62, 63, 64 which provide guiding tracks for the circuit boards 26 and 28.

The side 14 of the memory plane is provided with integral electrical connector elements 66 (FIGURE 3) which extend therethrough and which each have a wire-connection end 68 inside the frame 10 and a quick-disconnect connector end 70 outside the frame 10. The opposite side 70 of the memory plane 10 is provided with terminal elements 72 which extend therethrough and which each have a wire-connection end 74 inside the frame and a wire-connection end 76 outside the frame. The connector elements 66 and the terminal elements 72 are positioned in a compact staggered relationship.

Each of the column conductors 22 links a column of ferrite cores 25, and each is connected at one end to the wire-connection end 68 of a connector element 66, and is connected at the other end 68 of a connector element 66, and is connected at the other end to the wire-connection end 74 of a terminal element 72. An insulating sheet 78 is positioned between the two layers or planes of memory elements and column conductors inside the frame defining the memory plane.

The circuit board 28 includes a planar insulating board 32 having an insulating member 34 mounted along one edge thereof. The side edges of the insulating board 32 are adapted to slide in guides or tracks on the extensions 62, 63, 64. Electrical connector elements 80 extend through the insulating member 34 and each connector element has a printed-circuit-board connection end 82 and a quick-disconnect connector end 84. The quick-disconnect connector ends 84 are adapted to engage the quick-disconnect connector ends 70 extending from the side 14 of the memory plane 10. A guide pin 86 and a socket 88 insures exact alignment of the connector ends 84 and 70. The circuit board 28 is provided with a number of circuit elements such as diodes 30 having terminals 90 which are connected by a printed circuit (not shown) to the printed-circuit-connection ends 82 of the connector elements 80.

As has been explained in connection with the circuit of FIGURE 1 of the drawings, some of the quick-disconnect connector elements on both the memory plane and on the circuit boards are employed for quick-disconnect connections from the buses 36 and 38 on the boards, through the memory plane 10 to the external conductors 44, 46, 48, 50. By this construction, all of the electrical connections to a printed-circuit board 28 can be quickly broken, and a circuit board can be quickly removed and replaced.

The construction according to the invention permits the use of automated printed wiring techniques in making the numerous closely spaced electrical connections between the terminal elements 80 and the diodes 30, and automated production techniques in making the quick-disconnect connectors. Therefore, the construction provides both an economy in manufacture, and an economy due to the speed with which servicing can be performed. The construction also provides improved high speed electrical operating characteristics due to the compactness possible with the construction.

What is claimed is:

1. A random access memory construction comprising a frame made of insulating material, unitary electrical connector elements extending through one side of said frame, each of said connector elements having a wire-connection end inside the frame and having a quick-disconnect connector end outside the frame, terminal elements extending through an opposite side of said frame and each having a wire-connection end on the inside of the frame and a wire-connection end on the outside of the frame, columns of memory elements arranged in said frame, column conductors each linking one column of memory elements and each connected from the inside wire-connection end of a connector element to the inside wire-connection end of a terminal element, a printed circuit board having an insulating member along one edge thereof, and unitary electrical connector elements extending through said member, each of said connector elements having a printed-circuit-connection end and having a quick-disconnect connector end adapted to engage the quick-disconnect connector end of one of said connector elements on said frame.

2. A random access memory construction comprising a frame made of insulating material, unitary electrical connector elements extending through one side of said frame, each of said connector elements having a wire-connection end inside the frame and having a quick-disconnect connector end outside the frame, terminal elements extending through an opposite side of said frame and each having a wire-connection end on the inside of the frame and a wire-connection end on the outside of the frame, columns of memory elements arranged in said frame, column conductors each linking one column of memory elements and each connected from the inside wire-connection end of a connector element to the inside wire-connection end of a terminal element, a plurality of printed circuit boards each having a plurality of diodes mounted thereon and having an insulating member along one edge thereof, and unitary electrical connector elements extending through said member, each of said connector elements having a printed-circuit-connection end and having a quick-disconnect connector end adapted to engage the quick-disconnect connector end of one of said connector elements on said frame.

3. A random access memory construction comprising a frame made of insulating material, unitary electrical connector elements extending through a first side of said frame, each of said conductor elements having a wire-connection end inside the frame and having a quick-disconnect connector end outside the frame, unitary terminal elements extending through an opposite second side of said frame and each having a wire-connection end on the inside of the frame and a wire-connection end on the outside of the frame, columns of memory elements arranged in said frame, column conductors each linking one column of memory elements and each connected from the inside wire-connection end of a connector element to the inside wire-connection end of a terminal element, additional unitary terminal elements extending through a third side of said frame and each having a wire-connection end on the inside of the frame, additional conductors each connected from the inside end of a connector element to the inside end of one of said additional terminal elements, a printed circuit board having a plurality of diodes mounted thereon and having an insulating member mounted thereon along one edge thereof, said insulating member having cross-sectional dimensions approximately the same as the cross-sectional dimensions of said first side of said frame, alignment pins and alignment holes on said insulating member and said first side of said frame, and unitary electrical connector elements extending through said insulating member, each of said connector elements having a printed-circuit-connection end and having a quick-disconnect connector end adapted to engage the quick-disconnect connector end of one of said connector elements on said frame.

References Cited by the Examiner

UNITED STATES PATENTS

| | | | |
|---|---|---|---|
| 2,823,360 | 2/58 | Jones | 317—101 |
| 2,968,019 | 1/61 | Steinman | 317—101 |
| 3,026,494 | 3/62 | Andersen et al. | 339—17 |

JOHN F. BURNS, *Primary Examiner.*

SAMUEL BERNSTEIN, *Examiner.*